G. F. GOERNER.
APPARATUS FOR BORING DRIFTS OR SHAFTS.
APPLICATION FILED JUNE 2, 1920.
1,413,471.    Patented Apr. 18, 1922.
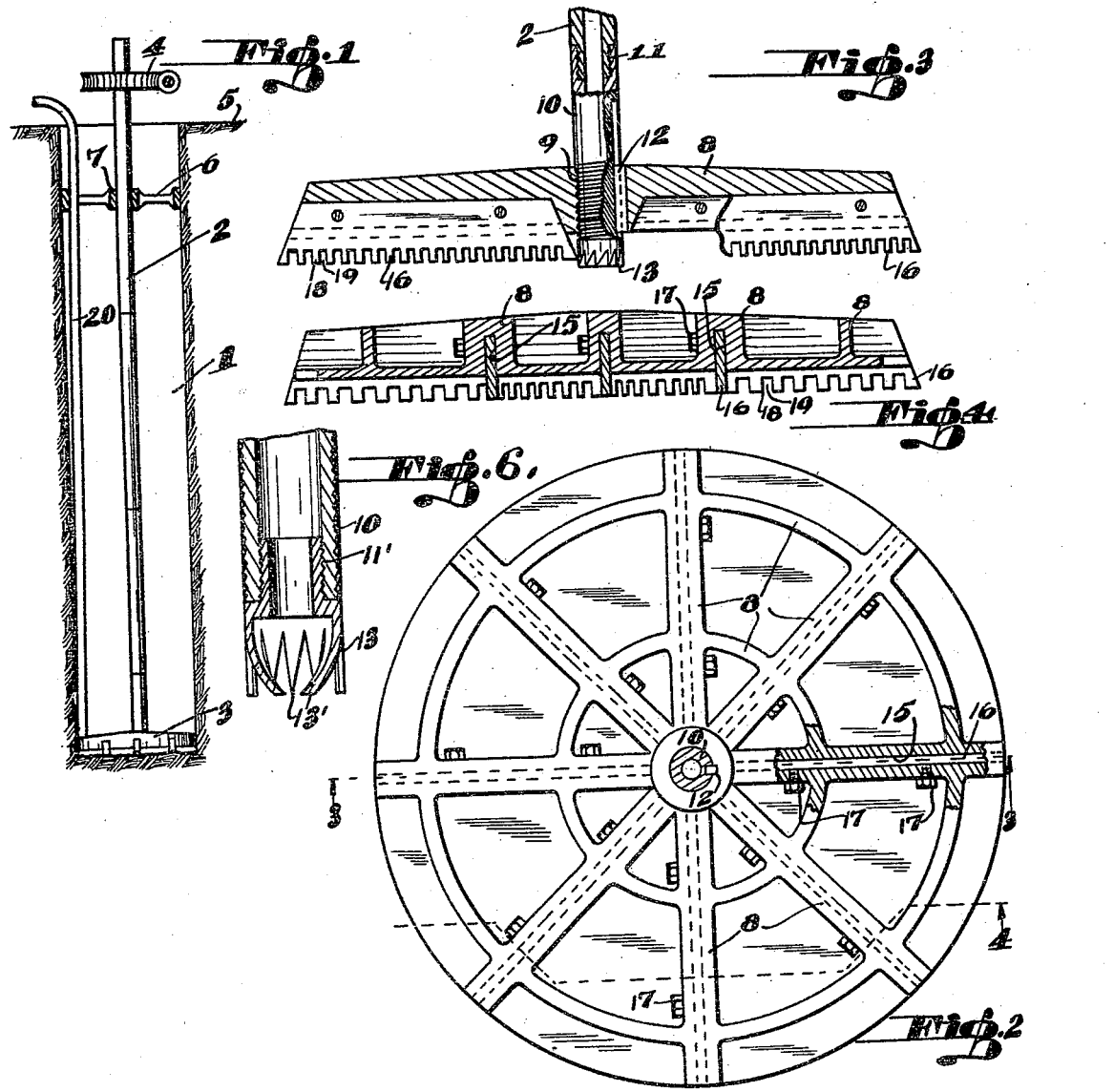
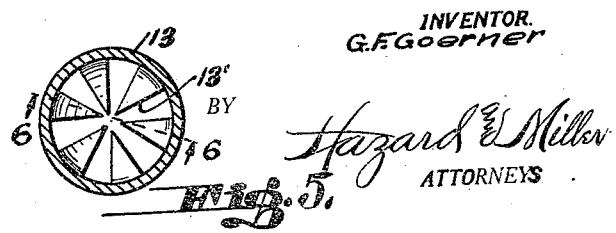
INVENTOR.
G. F. Goerner
BY
Hazard & Miller
ATTORNEYS

UNITED STATES PATENT OFFICE.

GEORGE F. GOERNER, OF LOS ANGELES, CALIFORNIA.

APPARATUS FOR BORING DRIFTS OR SHAFTS.

1,413,471.  Specification of Letters Patent. Patented Apr. 18, 1922.

Application filed June 2, 1920. Serial No. 385,968.

*To all whom it may concern:*

Be it known that I, GEORGE F. GOERNER, a citizen of the United States, residing at Los Angeles, in the county of Los Angeles and State of California, have invented new and useful Improvements in Apparatus for Boring Drifts or Shafts, of which the following is a specification.

This invention relates to an apparatus for boring drifts or shafts and the like. It is the object of the invention to provide an apparatus by means of which a drift, shaft, or the like of full working size may be bored by a single operation. It is a further object of the invention to provide an apparatus of this character having means associated therewith for discharging cooling liquid beneath the boring disc of the apparatus, said liquid also aiding in working the ground material outwardly toward the edge of the boring disc. It is a still further object of the invention to provide means for withdrawing the ground material as it is cut.

The invention will be readily understood from the following description of the accompanying drawings, in which—

Figure 1 is a side elevation of the improved apparatus in operative position.

Fig. 2 is a top plan view of the boring disc.

Fig. 3 is a transverse section on the line 3—3 of Fig. 2.

Fig. 4 is a transverse section on the line 4—4 of Fig. 2.

Fig. 5 is a bottom plan view of the cutter head.

Fig. 6 is a longitudinal section on the line 6—6 of Fig. 5.

The improved boring apparatus consists essentially of a rotatable shaft having a boring disc fixed for rotation upon the end thereof, said boring disc being of the diameter of the finished shaft, drift, or the like. The shaft of the apparatus may be positioned in either a horizontal, vertical or intermediate plane, depending upon where the shaft, or drift and the like is to be bored. It will be understood that a boring disc of any required diameter may be employed, said boring disc being arranged to make a boring the required size of the finished work, said boring having the sides thereof in a smooth condition and thereby eliminating the usual trimming down of rocks and the like to accommodate the timbers.

In the specific embodiment of the invention as illustrated I show the improved apparatus boring a shaft 1, the main shaft of the apparatus being shown at 2 and the boring head at 3. The main shaft 2 preferably comprises hollow pipe sections to which sections will be added as the work progresses. This main shaft may be rotated in any suitable manner, shown in the present instance as comprising a worm driving connection 4 arranged above the surface level 5. When the work has progressed to an appreciable depth one or more bearings may be provided in the boring for the main shaft 2, one of said bearings being shown at 6 as comprising a spider fitting within the boring and forming a bearing 7 for the main shaft.

The boring head comprises a disc which may be provided upon its rear face with suitable strengthening ribs 8. The boring disc is provided with a central opening 9 through which is threaded a hollow cutting head 10 secured upon the end of the hollow main shaft by the threaded connection 11. The cutting head is preferably keyed to the boring disc as shown at 12 and the end of said cutting head projects slightly beyond the outer surface of the boring disc and is provided with an annular cutting end 13 surrounding the hollow interior of the cutting head.

The cutting end 13 is preferably detachably connected to the cutting head 10 as by the threaded connection 11', and said cutting end is provided with teeth 13'. Alternate ones of said teeth preferably extend substantially parallel to the longitudinal axis of the cutting end, while the other set of alternate teeth are preferably bent inwardly so as to meet at the axis of said cutting end. By this arrangement the hollow cutting head is adapted to permit of discharge of fluid therethrough between the alternate inwardly bent teeth of the cutting end while said teeth will make an axial boring and thus prevent a core being formed in the boring made by the apparatus.

In the form of the invention illustrated in Figs. 2, 3 and 4, the boring disc is provided at its outer surface with a plurality of radially extending grooves 15 provided in ribs 8 and in which cutting blades 16 are arranged to be received, said cutting blades being preferably held in position by set screws 17 extending through ribs 8. The cutting edges of the blades 16 may consist of alternate blades and grooves 18 and 19 longitudinally of said blades, as clearly shown in Fig. 3, the plane of the cutting edge formed by the blades 16 being slightly in the rear of the plane of the cutting edges formed by the cutting head 10.

Means are preferably provided for withdrawing the ground material from the boring, said means being shown as comprising one or more pipes 20 arranged to be let down into the boring with their ends positioned at the edge of the boring disk. These pipes may be connected to any usual or preferred pumping apparatus for withdrawing the ground material past the edge of the boring disc. The pumping apparatus will also withdraw the liquid supplied to the face of the boring disc through the hollow cutting head, said liquid being adapted to cool the cutting surface of the boring disc, and also to force the ground material from the boring outwardly to the edge of the boring disc so that it may be withdrawn by the pumping apparatus.

The rotation of the boring disc will cause the cutting blades thereof to bore through either earth or rock for forming a boring of the required size, the cutting head 10 boring out the center of said boring and thereby eliminating coring of the same.

The liquid supplied to the cutting faces through the hollow main shaft and cutting head will cool the grinding surfaces of the apparatus and the suction formed through pipes 20 will withdraw the ground material as well as the said cooling liquid from the boring.

It will be apparent that various changes may be made in the construction as thus described without departing from the spirit of the invention.

What is claimed is:

1. A boring apparatus, comprising a hollow rotatable shaft, a boring disc fixed upon said shaft, and a hollow boring head in alinement with said hollow shaft and projecting beyond said boring disc, said boring head having cutting means upon the end thereof.

2. A boring apparatus, comprising a hollow rotatable shaft, a boring disc fixed upon said shaft, and a hollow boring head in alinement with said hollow shaft and carried by said boring disc, said boring head having cutting means upon the end thereof, said cutting means being alternately bent inwardly within the longitudinal projection of the hollow interior of the boring head and projected in longitudinal alinement beyond the boring head.

3. A boring apparatus, comprising a hollow rotatable shaft, a boring disc fixed upon said shaft, and a hollow boring head in alinement with said hollow shaft and open at its end, said open end projecting beyond said boring disc.

In testimony whereof I have signed my name to this specification.

GEORGE F. GOERNER.